(12) United States Patent
Schimmoeller et al.

(10) Patent No.: US 10,821,783 B2
(45) Date of Patent: Nov. 3, 2020

(54) VISUAL WEAR INDICATOR

(71) Applicant: COOPER TIRE & RUBBER COMPANY, Findlay, OH (US)

(72) Inventors: Ryan J. Schimmoeller, Ottoville, OH (US); Jeremy J. Jacobs, Findlay, OH (US); Daniel T. Strohscher, Findlay, OH (US); Kurt D. Utrup, Ottawa, OH (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 619 days.

(21) Appl. No.: 14/917,869

(22) PCT Filed: Sep. 10, 2014

(86) PCT No.: PCT/US2014/054981
§ 371 (c)(1),
(2) Date: Mar. 9, 2016

(87) PCT Pub. No.: WO2015/038641
PCT Pub. Date: Mar. 19, 2015

(65) Prior Publication Data
US 2016/0221400 A1   Aug. 4, 2016

Related U.S. Application Data

(60) Provisional application No. 61/875,858, filed on Sep. 10, 2013.

(51) Int. Cl.
*B60C 11/24*         (2006.01)
*B29D 30/68*         (2006.01)
(Continued)

(52) U.S. Cl.
CPC .............. *B60C 11/24* (2013.01); *B29D 30/68* (2013.01); *B29D 30/72* (2013.01); *B60C 13/001* (2013.01); *B29D 2030/685* (2013.01)

(58) Field of Classification Search
CPC ....... B60C 11/24; B60C 13/001; B60C 30/68; B60C 30/72; B60C 2030/685; B29D 30/68
See application file for complete search history.

(56) References Cited

U.S. PATENT DOCUMENTS 2,706,509 A   4/1955   White
3,653,422 A   4/1972   French
(Continued)

FOREIGN PATENT DOCUMENTS

CN   102452277 A   5/2012
CN   202399839 U   8/2012
CN   102452277 B   9/2014

OTHER PUBLICATIONS

PCT/US2014/054981, International Search Report and Written Opinion, dated Dec. 22, 2014.
(Continued)

*Primary Examiner* — Steven D Maki
*Assistant Examiner* — Cedrick S Williams
(74) *Attorney, Agent, or Firm* — Fay Sharpe LLP (57) ABSTRACT

A visual wear indicating feature is incorporated into the tread pattern to provide progressive, incremental indications to the customer regarding the amount of useable tread remaining on the tire.

11 Claims, 13 Drawing Sheets

(51) Int. Cl.
*B29D 30/72* (2006.01)
*B60C 13/00* (2006.01)

(56) References Cited

U.S. PATENT DOCUMENTS

| | | | |
|---|---|---|---|
| 3,929,179 | A | 12/1975 | Hines |
| 4,171,676 | A | 10/1979 | Kennel |
| 4,226,274 | A | 10/1980 | Awaya et al. |
| RE30,518 | E | 2/1981 | French |
| 5,980,668 | A | 11/1999 | Slingluff |
| 6,220,199 | B1 | 4/2001 | Williams |
| 6,253,815 | B1 | 7/2001 | Kemp et al. |
| 6,523,586 | B1 * | 2/2003 | Eromaki ............ B60C 11/24 152/154.2 |
| 6,709,138 | B1 | 3/2004 | Johnson |
| 6,883,567 | B2 | 4/2005 | Shimura |
| 7,011,126 | B2 | 3/2006 | Heinen |
| 7,291,237 | B2 | 11/2007 | O'Brien et al. |
| 7,670,123 | B2 | 3/2010 | Cuny et al. |
| 7,766,061 | B2 | 8/2010 | Mayni et al. |
| 7,784,508 | B2 | 8/2010 | Kemp et al. |
| 8,162,014 | B2 | 4/2012 | Mosko et al. |
| 8,584,721 | B2 | 11/2013 | Fuji et al. |
| 2006/0213594 | A1 * | 9/2006 | Kemp ............ B60C 11/24 152/154.2 |
| 2009/0095388 | A1 * | 4/2009 | Cuny ............ B60C 11/1384 152/154.2 |
| 2010/0200137 | A1 | 8/2010 | Narita |
| 2011/0007933 | A1 | 1/2011 | Lempitsky |
| 2012/0090749 | A1 * | 4/2012 | Ohashi ............ B60C 11/1218 152/209.18 |
| 2012/0103484 | A1 * | 5/2012 | Ohashi ............ B60C 11/24 152/154.2 |
| 2012/0125499 | A1 * | 5/2012 | Harvey ............ B60C 11/24 152/154.2 |
| 2013/0333458 | A1 * | 12/2013 | Lamb ............ B60C 13/001 73/146 |

OTHER PUBLICATIONS

CN2014800575168 First Office Action/Search (and English Translation) dated Jan. 26, 2017.
EP 14843343.6 Extended European Search Report, dated Apr. 4, 2017.
EP 14843343.6 Communication Pursuant to Article 94(3) EPC, dated May 23, 2019.

* cited by examiner

|   | MINIMIM | MAXIMUM |
|---|---|---|
| A | 0.05 | 1.00 |
| B | 0.05 | 1.00 |
| C | 1.00 | 0.05 |
| D | 0.05 | 1.00 |
| E | 100% OF D | 150% OF D |
| F | 75% OF D ||
| G | 50% OF D ||
| H | 25% OF D ||

|   | MINIMIM | MAXIMUM |
|---|---------|---------|
| A | 0.10 | 2.00 |
| B | 0.05 | 0.50 |
| C | 1 | 12 |
| D | 0.02 | 0.20 |
| E | 0.02 | 0.20 |
| F | 0.00 | 1.00 |
| G | 0.02 | 0.20 |
| H | 0.01 | 2.00 |

| DIMENSION | MINIMIM | MAXIMUM |
|---|---|---|
| LETTER DEPTH | 0.01 | 1.00 |
| LETTER HEIGHT | 0.05 | 1.00 |
| ANGLE | 90° | 180° |
| THICKNESS | 0.01 | 0.50 |
| A | 0.05 | 1.00 |
| B | 0.05 | 2.00 |
| C | 0.01 | 1.00 |

INSPECT

VISUAL WEAR INDICATOR

This application claims the priority benefit of U.S. provisional application Ser. No. 61/875,858, filed Sep. 10, 2013.

BACKGROUND

This disclosure is directed to tires, and more particularly a system and method for indicating tread wear in connection with use of a tire over time.

Tread wear indicators (TWI) or wear bars are well known in the art. Typically, the tread wear indicator extends laterally across the tire at a radial height above the base or bottom wall of the groove, or surface of the tire. When the tread has worn to a depth of 2/32" or 1/16", the tread wear indicators become flush to the surface and laterally span across the tread and grooves from an inside shoulder to an outside shoulder of a tire.

However, there is a desire to provide greater information to the tire owner or consumer regarding the amount of tread remaining on the tire. Known indicators are usually complex, too large, or are not basically intuitive to the tire owner when inspecting the tires. Thus, there is a desire to provide a visual wear indicator that is simple, compact, easily notifies or conveys to the tire owner how much tread is remaining on the tire, and will provide feedback on wear balance.

DETAILED DESCRIPTION

Figure 1:
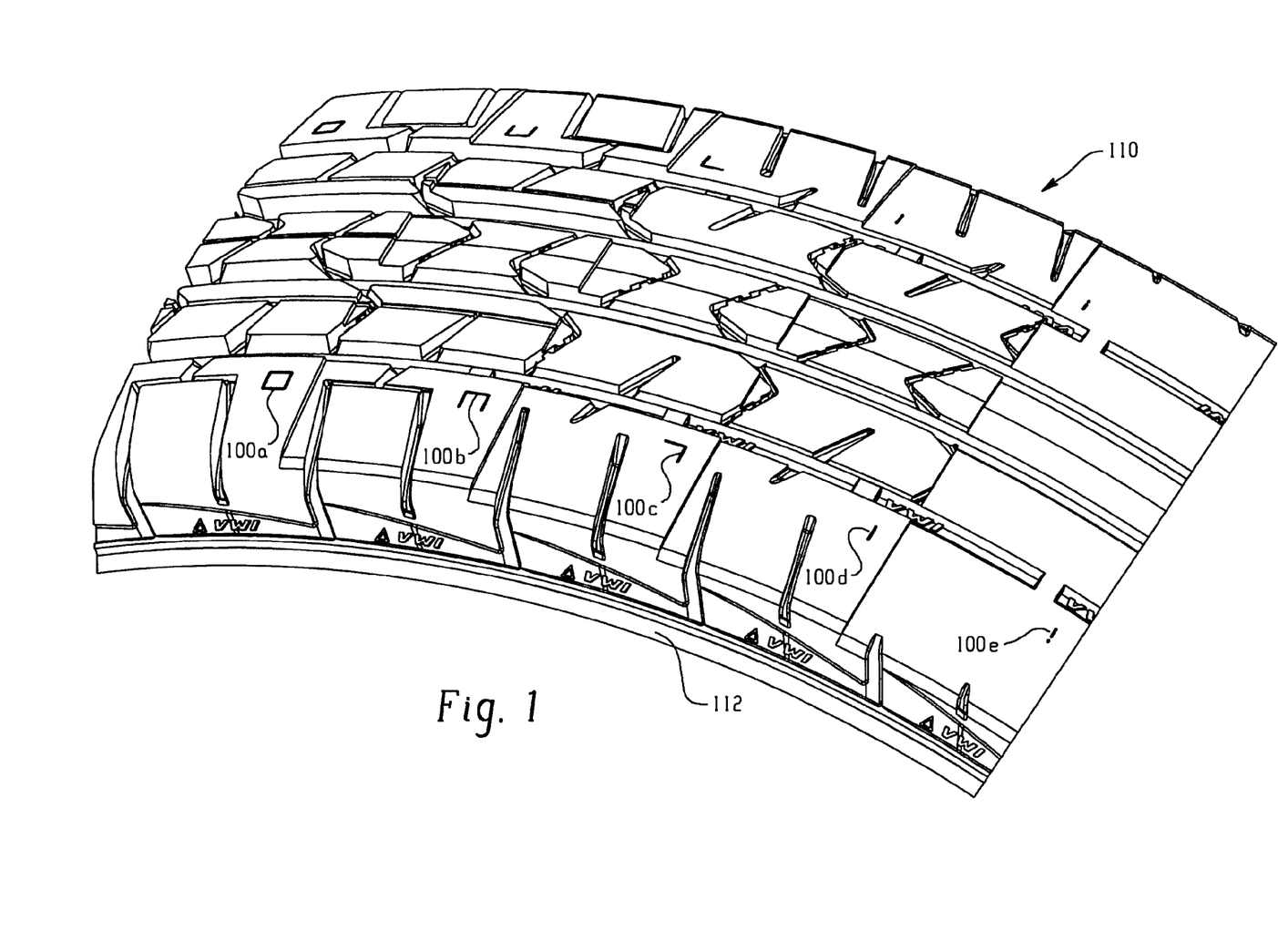
FIG. 1 is a perspective view of a tread portion of a tire through stages of its life extending from the outer sidewall to the inner sidewall over a portion of the total circumference of the tire incorporating a visual wear indicating feature.
Figure 2:
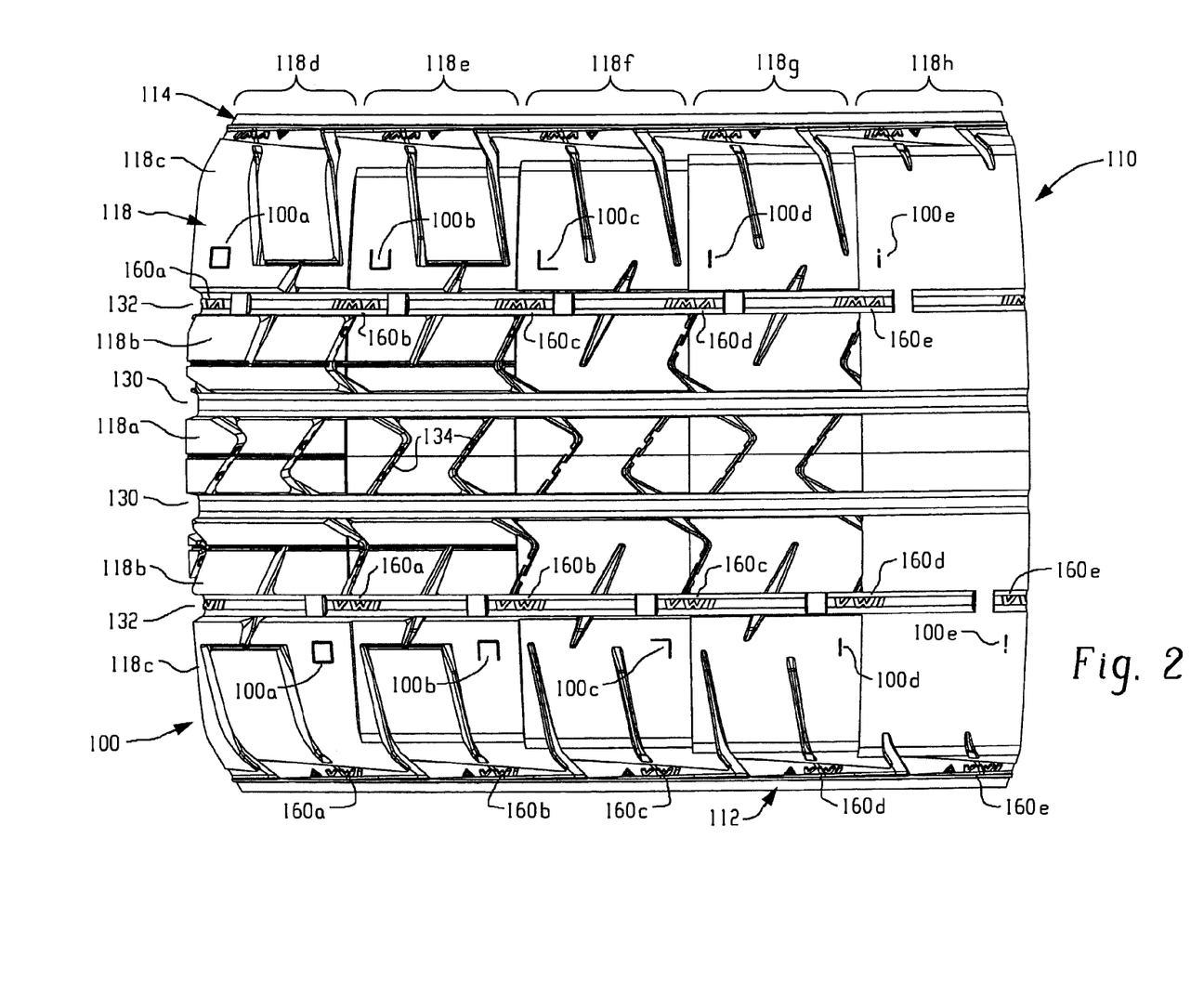
FIG. 2 is a plan view of the tread portion of FIG. 1.

Turning first to FIGS. 1-6, a first embodiment of a visual wear indicating feature or visual wear indicator (VWI) 100 is shown. More specifically, a tire 110, and particularly just a portion of the tire, is shown in FIGS. 1 and 2. A first or inner sidewall 112 and a second or outer sidewall 114 are interconnected in a lateral direction by tire surface 116 which includes a tread or tread portions 118. In the particular embodiment shown in these two figures, first and second inner or central, circumferential grooves 130 extend about the circumference of the tire 110. In addition, first and second outer, circumferential grooves 132 also extend about the circumference of the tire. Of course one skilled in the art will appreciate that a greater or lesser number of circumferential grooves may be provided without departing from the scope and intent of the present disclosure.

The tread portion 118 may adopt a wide variety of configurations (e.g., symmetrical, asymmetrical, directional, etc.). For example, central tread portion 118a disposed between the first and second central circumferential groove 130 may have one pattern, and adjacent tread portions 118b disposed laterally between respective pairs of the inner and outer grooves 130, 132 may have the same or a different pattern. Still further, shoulder tread portions 118c disposed laterally between the respective outer circumferential grooves 132 and inner/outer sidewalls may again have the same or a different pattern. As is evident from FIGS. 1 and 2, the illustrated embodiment of the tire 110 has a first tread pattern 118a, a second tread pattern 118b, and a third tread pattern 118c, and the pair of tread patterns 118b and 118c are mirror images of one another. Further, the tread 118 may include one or more lateral grooves 134 that extend partially or entirely through one or more of a particular tread portion(s) 118a, 118b, 118c. Again, the configuration of the grooves is not described herein since the design of the grooves forms no part of the present disclosure, and could adopt a wide variety of conformations.

It will also be appreciated that the tread portion 118 of the tire 110 has been divided into five contiguous segments 118d, 118e, 118f, 118g, and 118h (the segments extending in the circumferential direction) illustrating various degrees of wear of the tire tread. In other words, the representative segments 118d-118h are intended to illustrate incremental stages of tread wear ranging from a new tire to a worn tire, and it is unlikely that a tire would ever encounter tread wear in the circumferential direction as shown. More specifically, the first segment 118d represents the tire tread 118 from full tread (100% tread depth or new) to 75% of the useable tread depth; the second segment 118e is indicative of the tread between 50%-75% of the useable tread depth; the third segment 118f represents the tread between 25%-50% of the useable tread depth; the fourth segment 118g represents the tread between 2/32"-25% of the useable tread depth; and the fifth segment 118h is indicative of the tread at less than or equal to 2/32". Thus, the representative pattern of the tread 118 changes in these various segments 118d-118h as the tire wears.

Figure 3:
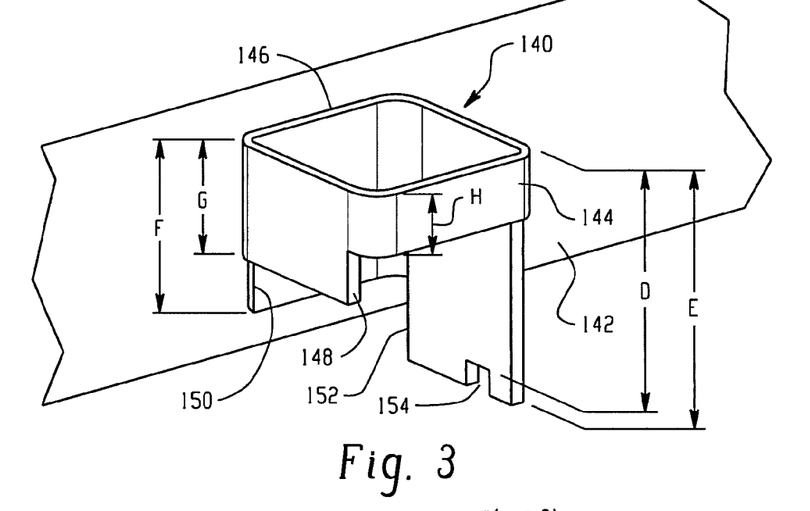
FIG. 3 is a perspective view of a mold component that forms a first preferred embodiment of a visual wear indicator.
Figures 4, 5:
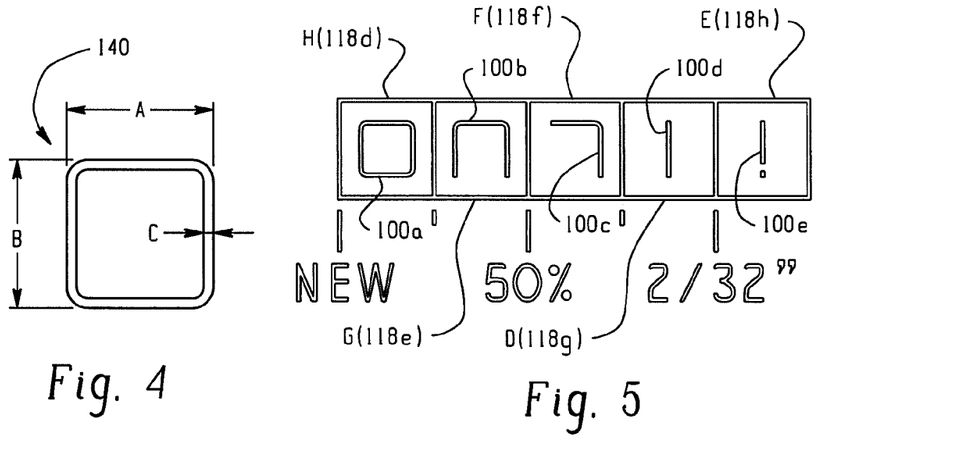
FIG. 4 is a top plan view of the mold component of FIG. 3.
FIG. 5 is an illustration of the siping in the tread and its progressive change in conformation or visual impression as the tread wears on the tire.

For ease of illustration, and to reduce the complexity of the drawings, other features of the tread pattern 118 have been omitted. For example, chamfers, groove shapes, sipes, etc. may form a part of the tire but have been removed from the drawings for ease of illustration and understanding. One feature that remains in the drawings is the visual wear indicator 100 provided in the tire 110. A first embodiment of a mold component or sipe blade 140 that forms the sipe or visual wear indicator 100 in the tire 110, namely the tire tread 118, is shown in FIGS. 3-4. The sipe blade 140 is secured to an inner surface 142 of a mold that forms the tire in a manner well known in the art. This version of the visual wear indicator or sipe blade 140 has a first or upper portion 144 that extends in a continuous fashion about an entire perimeter of the sipe blade from an upper terminal edge 146 to a depth H. As demonstrated in the chart of FIG. 6, the depth H is about 25% of the overall depth D measured from the upper terminal edge 146 to the 2/32" depth of the tread. The corresponding appearance of the sipe formed by the sipe blade 140 on the cured tire is shown in FIG. 5, and is also represented in segment 118d in FIGS. 1 and 2.

Below the depth H, one-fourth (¼) of the square-shaped sipe blade 140 is removed and is referenced by a second portion 148 that extends around the remaining three-fourths (¾) of the square-shaped sipe blade. The second portion 148 has a depth that ranges from H (about 25% of the overall depth D) to a depth G (representative of about 50% of the overall depth D). Thus as illustrated in FIGS. 1, 2, and 5, the appearance of the sipe on the tire tread extends over three sides of the original square-shape and is indicative of a tread depth ranging from about 50% to about 75% of the useable depth represented in tread segment 118e.

A third portion 150 of the sipe blade 140 has a depth that ranges from depth G (representative of about 50% of the overall depth D) to depth F (representative of about 75% of the overall depth D). The corresponding appearance of the sipe formed by the sipe blade 140 in this depth range of the tire tread is shown as two contiguous sides of the original square-shape (see middle region of FIG. 5) and that corresponds to segment 118f in FIGS. 1-2. This is indicative of a tread depth ranging from about 25% to about 50% of the useable depth.

A fourth portion 152 of the sipe blade 140 has a depth that ranges from depth F (representative of about 75% of the overall depth D) to depth D (representative of about 100% of the overall depth D). The corresponding appearance of the sipe formed by the sipe blade 140 in this depth range of the tire tread is shown as one side of the original square shape (see region D/118g of FIG. 5) and that corresponds to segment 118g in FIGS. 1-2. This is indicative of a tread depth ranging from 0% to about 25% of the useable depth.

A fifth portion 154 of the sipe blade 140 has a depth that ranges from depth D (representative of 100% of the overall depth D) to depth E (representative of the 2/32" of the tread. As is known in the art, wear bars (required by law) become evident at this range of wear and the tire owner should be replacing the tire if it reaches this stage of wear and replacement of the tire has not already occurred. The corresponding appearance of the sipe formed by the sipe blade 140 in this depth range of the tire tread is shown as an exclamation point ("!"). The exclamation point is easily understood and clearly indicative of urgent action required by the tire owner to replace the tire.

Figure 6:
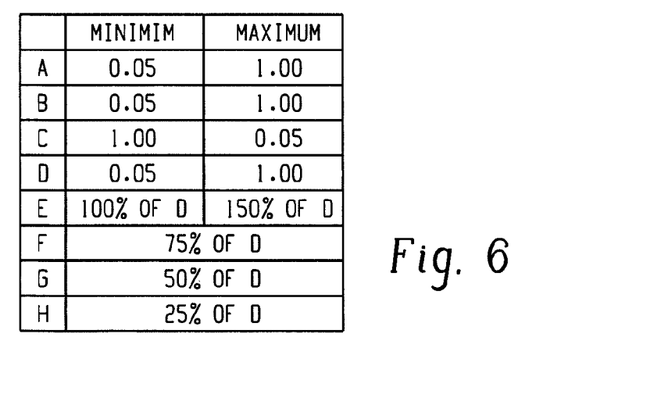
FIG. 6 is a table that provides relative dimensioning of the mold component of FIG. 3.

Representative dimensions of the first embodiment of the VWI 140 are provided in the table of FIG. 6. Of course other dimensions may also be used within the skill and knowledge of the tire manufacturer. These dimensions are preferred and provide a visual wear indicator that does not adversely impact on tire performance, and yet is easily viewed by the tire owner. The particular conformation of the square-shaped VWI 100 is also desirable because it shows incremental stages that can be easily recognized by the tire owner and inherently convey the extent of tire tread wear.

In order to assist the tire owner in monitoring the state of the tread wear, identical visual wear indicators (VWI) 100 are preferably located in the shoulder region(s) 118c of the tire tread. Further, the visual wear indicators (VWI) 100 are provided at spaced locations about the circumference of the tire 110. For example, it is contemplated that the VWI may be provided in both shoulder regions 118c of the tire tread and spaced 120° apart in the circumferential direction (i.e., at three spaced locations around the circumference of the tire). It is also contemplated that the visual wear indicators provided in the inner and outer shoulder regions would likely be spaced at the same location in the circumferential direction (i.e., aligned circumferentially at the same relative lateral location) to assist the tire owner in locating and checking the amount of tread wear. Of course the visual wear indicators 100 could be additionally or alternatively located at other positions in the tire tread 118, e.g., in central tire tread portion 118*a* and/or in tread portions 118*b* disposed laterally between the inner and outer grooves 130, 132, or provided in a greater or lesser number on the tire. Further, some type of indicia or text 160 (e.g., "VWI") is preferably provided along the sidewalls 112, 114 of the tire 110 at the same circumferential location as the visual wear indicators 100. Just as the visual wear indicators 100 may be additionally or alternatively positioned at other locations, the indicia or text 160 may likewise be additionally or alternatively positioned at other locations on the tire. For example, additional indicia 160 may be incorporated into the base of outer circumferential grooves 132 at locations that laterally align with the visual wear indicator sipes 100.

The wear square embodiment of FIGS. 1-6 includes sipes shaped as an open-centered square in the mold with varying depths on each side of the square. As the tire 110 wears, a side of the square is eliminated until the final stage shows an exclamation mark that indicates to the consumer/tire owner that the tire needs to be replaced. A perfect or complete square indicates that the tire 110 is in its early stages of life with greater than 75% of useable tread left. Three legs on the square represents 50% to 75% of useable tread left, two legs represents 25% to 50% of useable tread left, one leg represents less than 25% of useable tread left, and the exclamation mark ("!") represents that less than ⅔₂nds of tread remains.

Figure 7:
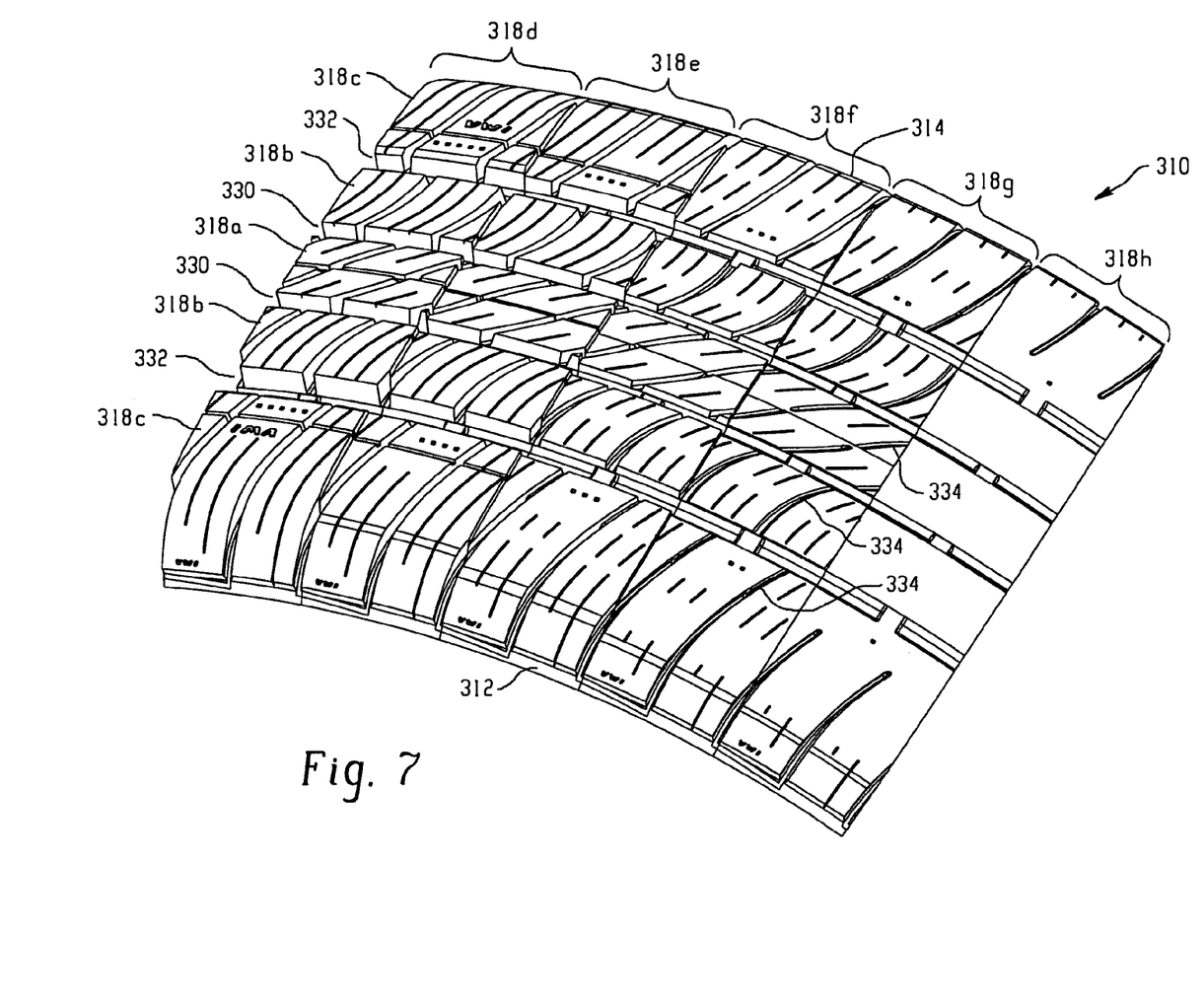
FIG. 7 is a perspective view of a tread portion of a tire through stages of its life extending from the outer sidewall to the inner sidewall over a portion of the total circumference of the tire and incorporating a different visual wear indicating feature.
Figure 8:
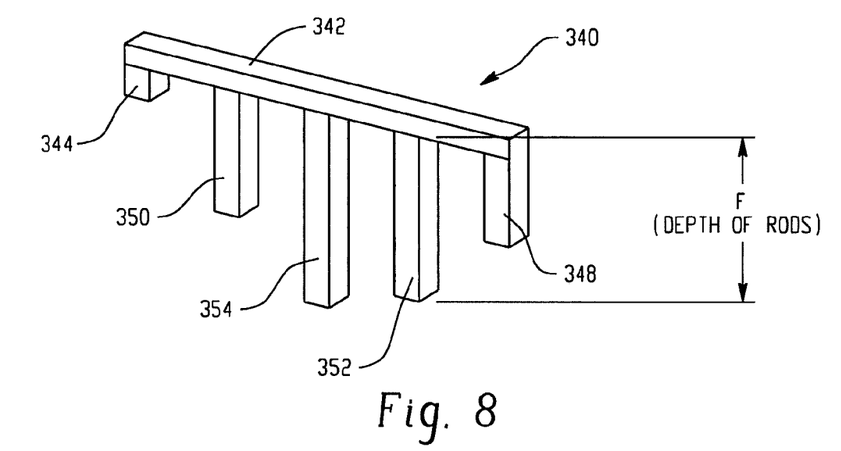
FIG. 8 is a perspective view of a mold component that forms a second preferred embodiment of a visual wear indicator.
Figure 9:
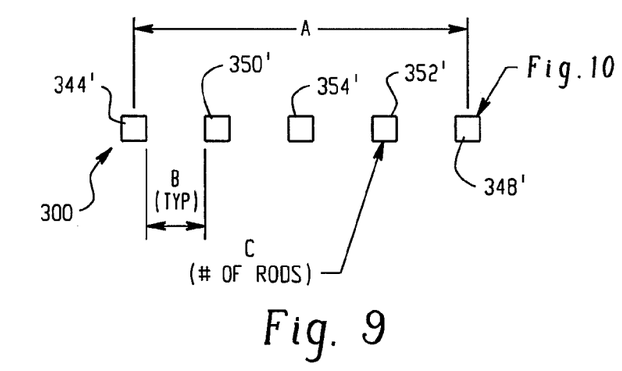
FIG. 9 is a plan view of a series of square openings or holes incorporated into the tread via the mold component of FIG. 8.

FIGS. 7-10 illustrate a second preferred embodiment of the visual wear indicating feature. One skilled in the art will appreciate that many of the same concepts from the first embodiment of FIGS. 1-6 apply to this version so that some of the general description will be omitted relative to the second embodiment since the features may be understood from the details described in connection with the first embodiment. For example, the location of the visual wear indicators 300 and associated indicia 360 on the tire 310 (a portion of which is shown in FIG. 7) apply equally to this arrangement. Again, the illustrated tire portion is shown in five segments 318*d*, 318*e*, 318*f*, 318*g*, and 318*h* that represent five distinct stages of tread wear. Here, mold component 340 (FIG. 8) includes a body 342 (which in the preferred arrangement is an elongated, generally linear structure) that is secured to the inner surface of the tire mold (not shown). Extending outwardly from the body 342 are distinct rods or arms 344, 348, 350, 352, 354 that each has a square-shaped cross-section. The rod 344 extends outwardly from the body 342 so that the corresponding left-most opening or sipe 344' shown in FIG. 9 is visible (along with the remaining corresponding sipes 348', 350', 352', and 354') on the tire tread 318 during the early stages of life, i.e. with greater than 75% of useable tread left. When the 75% threshold is met, sipe 344' is no longer visible while the remaining openings or sipes (348', 350', 352', and 354') are visible, and this indicates that 50%-75% of the useable tread remains. In a similar fashion, rod 348 creates sipe 348' shown in FIG. 9 and when both sipes 344' and 348' are no longer visible (but sipes 350', 352', 354' are still visible), this indicates that 25%-50% of the useable tread remains. Likewise, rod 350 creates sipe 350' and when sipes 344', 348', and 350' are no longer visible but sipes 352', 354' are still visible, then less than 25% of the useable tread remains. Similarly, rod 352 creates sipe 352' and when sipe 352' is no longer visible but sipe 354' is still visible, this indicates that less than ⅔₂" of tread remains.

Figure 10:
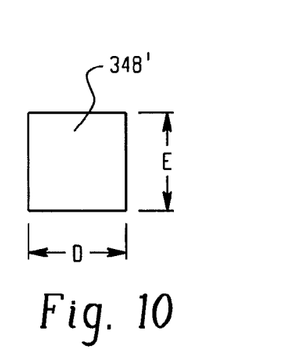
FIG. 10 is an enlarged view showing the details of one of the square holes.
Figure 11:
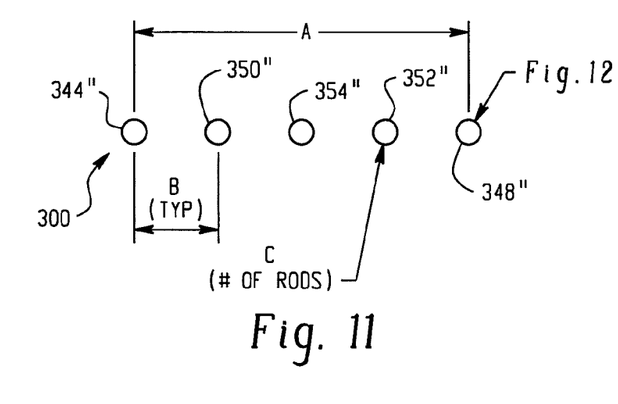
FIG. 11 is a plan view of plural, rounded holes (third embodiment) incorporated into the tread via a mold component similar to that shown in FIG. 8.
Figure 12:
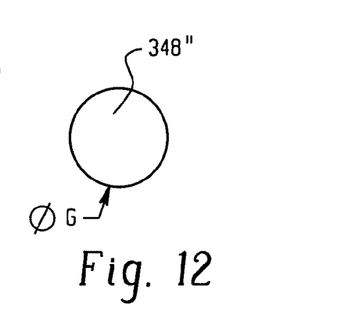
FIG. 12 is an enlarged view showing the details of one of the rounded holes.

The openings or sipes 344", 348", 350", 352", and 354" illustrated in FIGS. 11 and 12 are substantially identical to the sipes shown in FIGS. 9 and 10 except they have a round-shaped cross-section. For purposes of brevity and ease of understanding, these sipes are identified by the same reference numeral with a double prime suffix ("). In substantially all other aspects, the third embodiment of FIGS. 11-12 is substantially identical to the second embodiment of FIGS. 9-10, and correspondingly the shape of the rods 344, 348, 350, 352, and 354 extending from the body 342 of the mold component 340 shown in FIG. 8 would be modified so that each rod has a rounded or circular cross-section. Due to the varied length of the rods, the corresponding sipes 344", 348", 350", 352", and 354" have different depths and will convey the same type of tread wear indication to the tire owner as described above in connection with the previous embodiments. Of course, the embodiments of FIGS. 7-12 demonstrate that the sipes may adopt a wide variety of shapes such as hexagonal, triangular, etc. without departing from the scope and intent of the present disclosure. Further, the position of the different rod lengths may be varied, e.g., the rod length may get progressively longer from one to the other (deep at one end and progressing to shallow at the other end), or still some other variation of the order of the pins may be used. Moreover, the pins may not have a constant cross-section over their length as the pins extend from the body. For example, it may be desirable to add draft angles or a taper to the pins so that the pins are more durable. Rather than having a constant cross-section along its length, the pins may have a larger cross-section at a base for increased strength.

Figure 13:
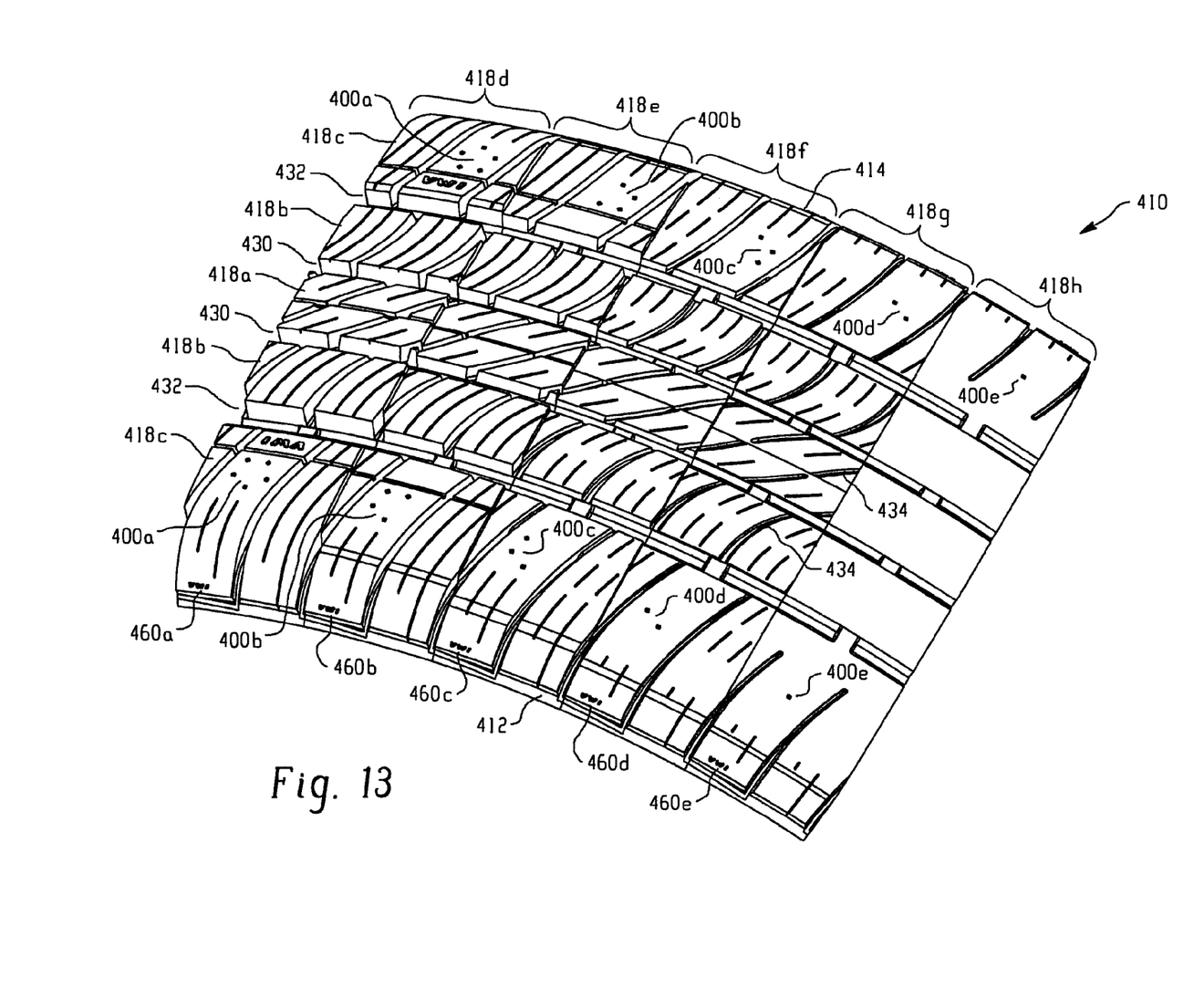
FIG. 13 is a perspective view of a tread portion of a tire through stages of its life extending from the outer sidewall to the inner sidewall over a portion of the total circumference of the tire and incorporating a different visual wear indicating feature.

FIGS. 13-16 illustrate another or fourth embodiment. Again, a portion of the tire 410 is illustrated in FIG. 13 and five separate segments 418*d*, 418*e*, 418*f*, 418*g*, and 418*h* are shown at different wear levels so that the corresponding visual wear indicator 400*a*, 400*b*, 400*c*, 400*d*, or 400*e* relates to the consumer/tire owner information representative of the tread depth relative to the original depth of the tread. More particularly, mold component 440 (FIG. 14) has a generally circular or rounded conformation. Body 442 is an annular component and five rods 444, 448, 450, 452, 454 extend outwardly from the body to create corresponding openings or sipes 444', 448', 450', 452', 454' in the tread pattern of the tire.

Figure 17:
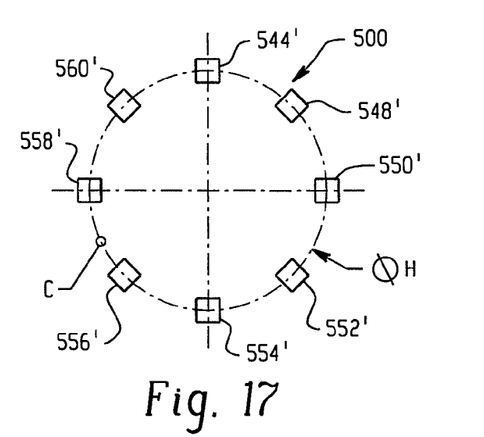
FIG. 17 is a plan view of plural, square holes similar to FIG. 15 but having an increased number of holes.
Figure 18:
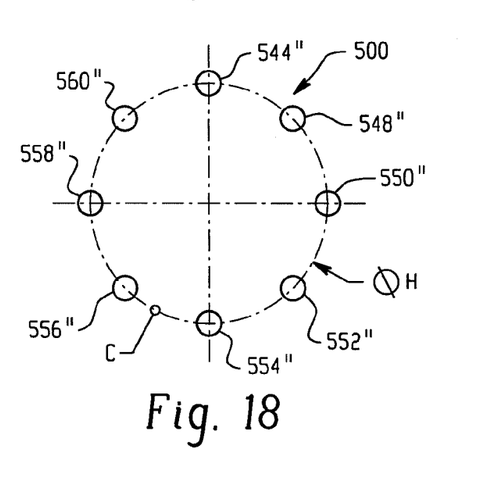
FIG. 18 is a plan view of plural, rounded holes similar to FIG. 16 but having an increased number of holes.

In a similar fashion, a fifth embodiment shown in FIG. 17 illustrates a series of square-shaped sipes 544', 548', 550', 552', 554', 556', 558', and 560' formed by rods arranged in a circular pattern extending from a body of a mold component or sipe blade (not shown). The increased number of rods/sipes provides intermediate depth information, i.e., higher granularity of tread depth information if each rod is made of a different length from an adjacent rod. FIG. 18 represents a sixth embodiment similar to the embodiment of FIG. 17, the only distinction being that the sipes 544", 548", 550", 552", 554", 556", 558", and 560" have a round or circular cross-sectional shape.

Figure 14:
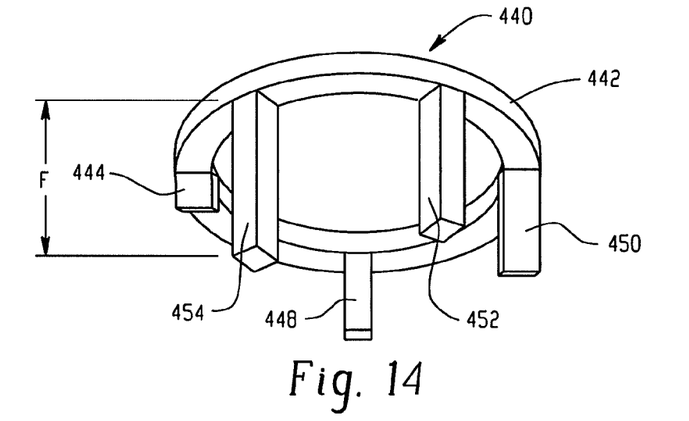
FIG. 14 is a perspective view of a mold component that forms a fourth preferred embodiment of a visual wear indicator.
Figure 15:
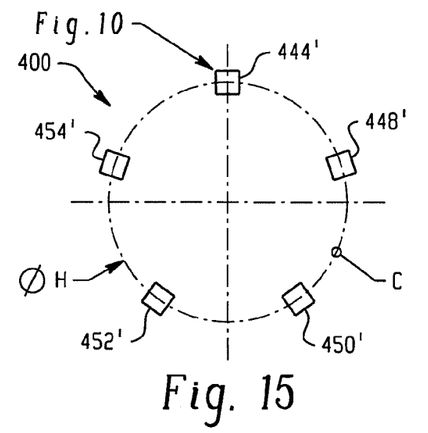
FIG. 15 is a plan view of plural, square openings or holes incorporated into the tread via the mold component of FIG. 14.
Figure 16:
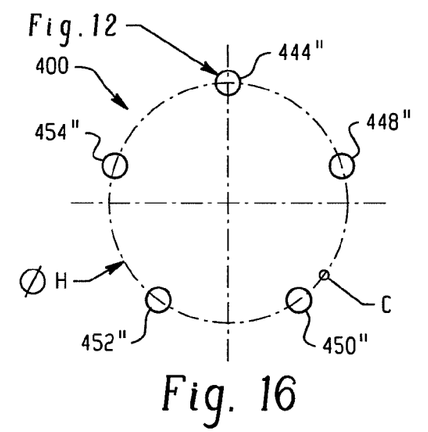
FIG. 16 is a plan view of plural, rounded holes incorporated into the tread via a mold component similar to that shown in FIG. 14.
Figure 19:
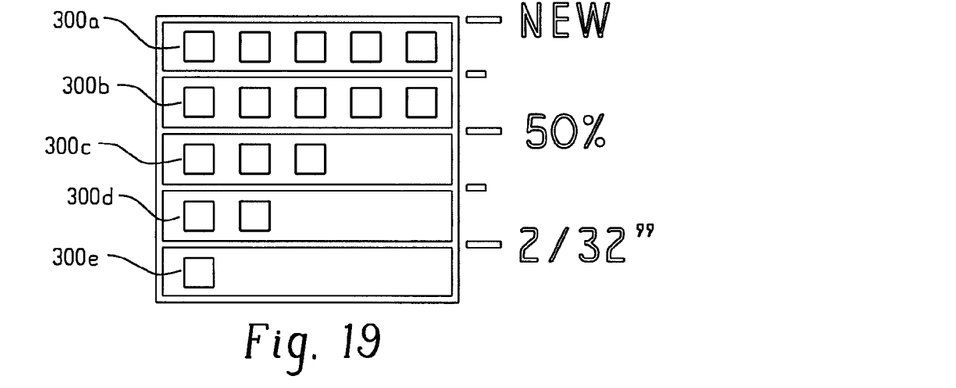
FIG. 19 is an illustration of the siping in the tread and its progressive conformation or change in visual impression as the tread wears on the tire (representative of the embodiments of FIG. 9, FIG. 11, or FIG. 15).
Figure 20:
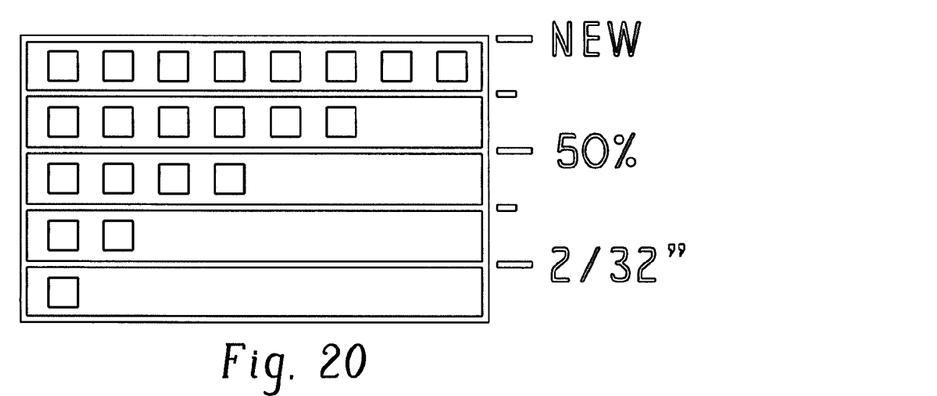
FIG. 20 is an illustration of the siping in the tread and its progressive change in conformation or visual impression as the tread wears on the tire (representative of the embodiments of FIG. 17 or FIG. 18).
Figure 21:
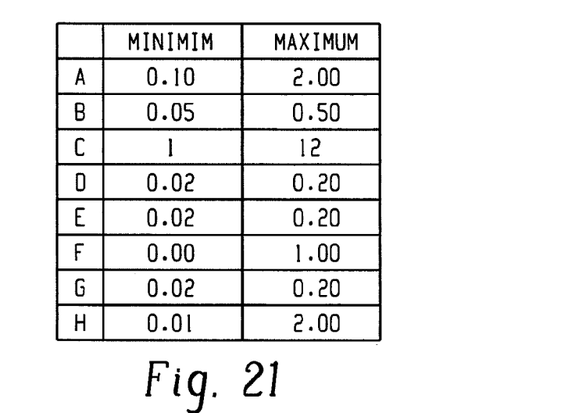
FIG. 21 is a table that provides relative dimensioning of the mold component of FIG. 8 or 14.
Figure 22:
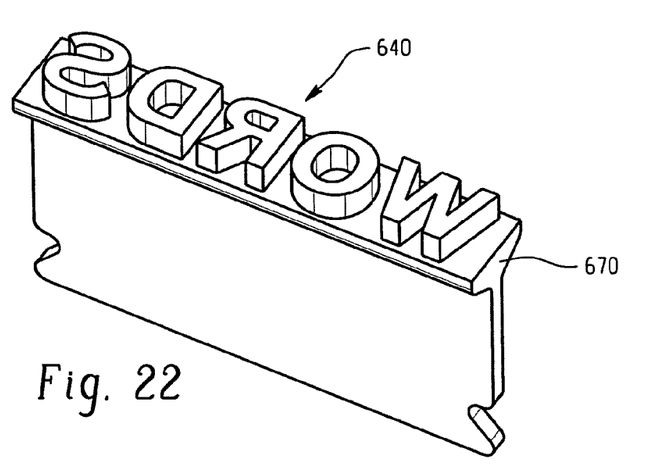
FIG. 22 is a perspective view of a mold component (sipe blade) that forms another preferred embodiment of a visual wear indicator.
Figure 23:
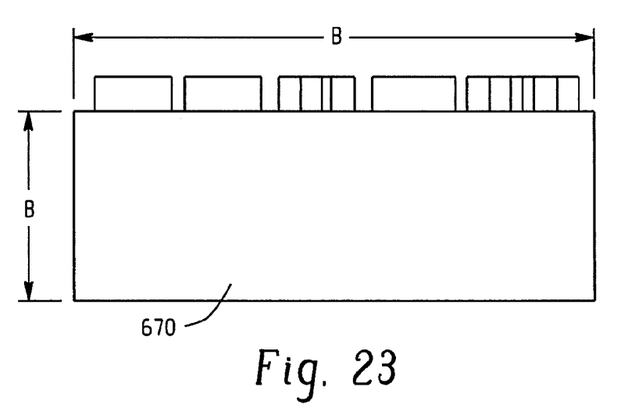
FIG. 23 is a side view of the mold component of FIG. 22.
Figure 24:
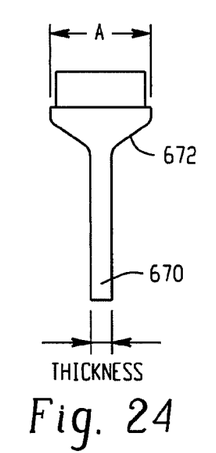
FIG. 24 is an end view of the mold component of FIG. 22.
Figure 25:
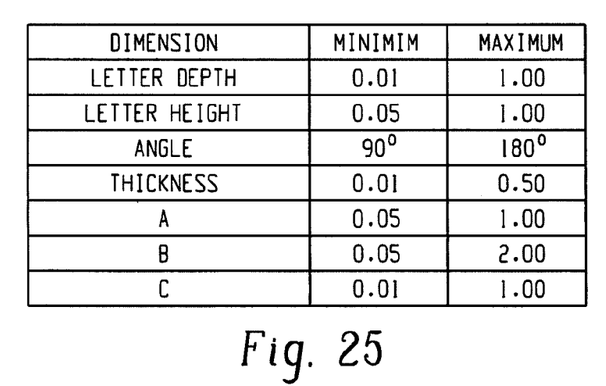
FIG. 25 is a table that provides representative dimensions of the mold component of FIGS. 22-24.
Figures 26, 28:
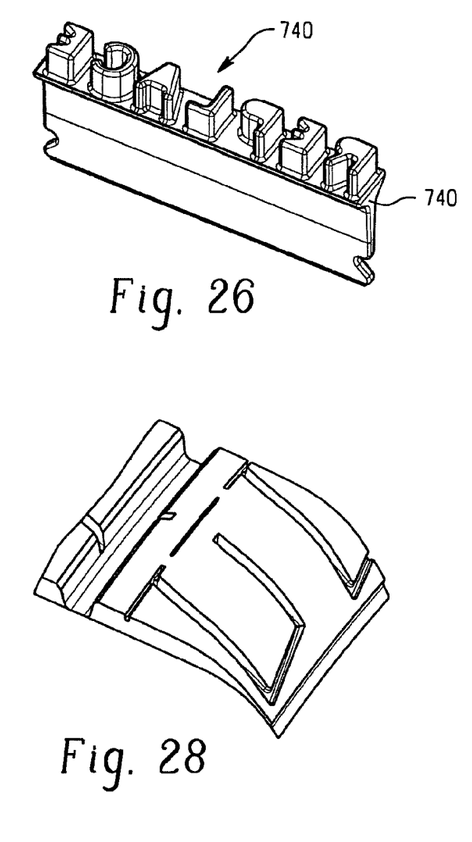
FIG. 26 is a perspective view of a mold component (sipe blade) that forms another preferred embodiment of a visual wear indicator.
FIGS. 28-31 are perspective views of a portion of the tire tread and its progressive change in conformation or visual impression as the tread wears.

The table of FIG. 19 demonstrates the correlation between the number of visible sipes relative to tread depth information for the embodiments of FIGS. 8-12 (and likewise for the embodiment of FIGS. 14-16 if arranged in a circular format). FIG. 20 illustrates how increased tread depth information is conveyed if a greater number of linear arranged rods/sipes were used, and one will appreciate how the same information would be conveyed if arranged in a circular format associated with FIGS. 17 and 18. Further, the table of FIG. 21 provides representative dimensions (in inches) relative to the mold component/sipes.

Turning next to the embodiment of FIGS. 22-25, the visual wear indicator could also be provided by a mold component or sipe blade 640 having a generally constant thickness or width 670 over most of a depth dimension "C" (FIG. 23) that forms a corresponding sipe (not shown) of the same width over most of a depth C. Once the tread has worn over substantially all of the corresponding depth C, the width increases through the angled portion 672, and then the letter or letters begin to reveal themselves as the tread continues to wear. Ultimately, the letters created by the sipe blade become visible in the worn tread, and may convey a message to the tire owner. It will also be appreciated that the sipe blade 640 may have a varying thickness over portion 670 or adopt different shapes, e.g., a corrugate shape, serpentine shape, etc.

Figure 27:
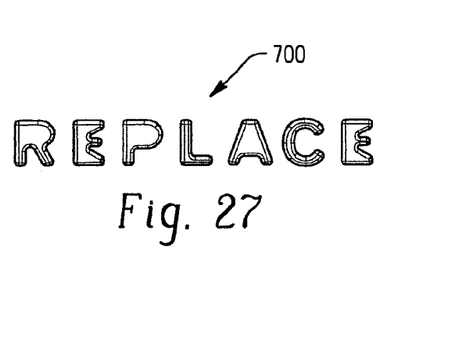
FIG. 27 shows the appearance of the word incorporated into the sipe blade of FIG. 26.
Figure 29:
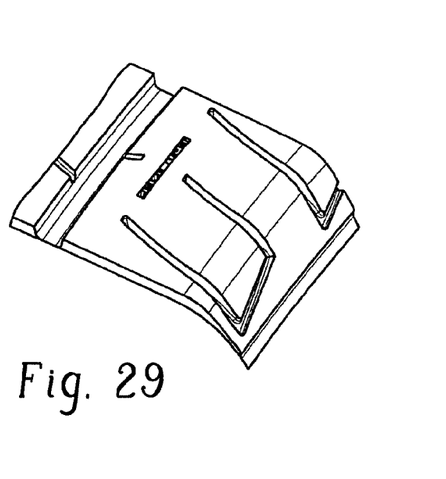
Figure 30:
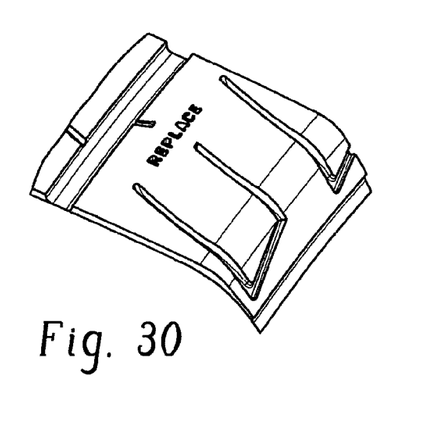
Figure 31:
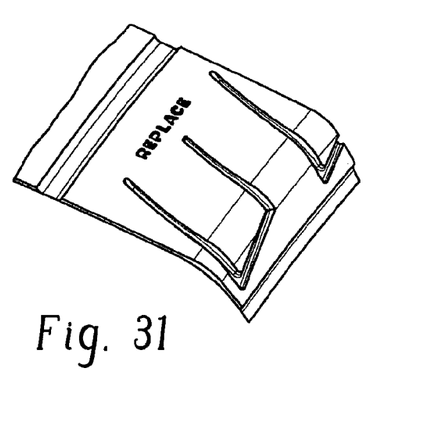
Figures 32, 34:
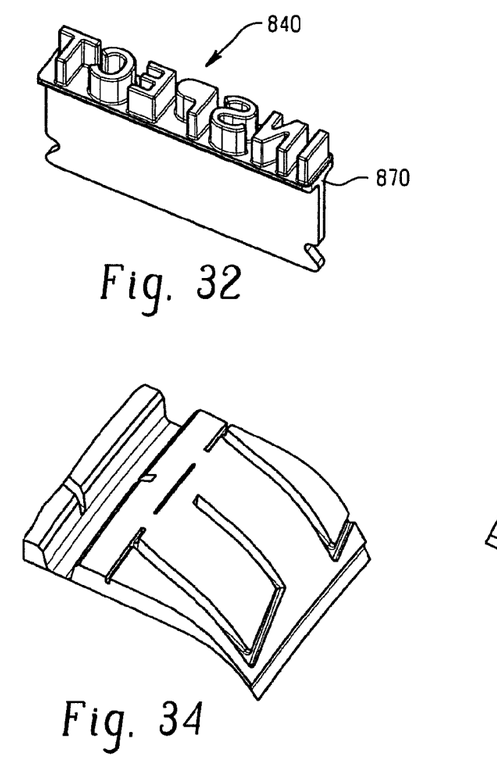
FIG. 32 is a perspective view of a mold component (sipe blade) that forms another preferred embodiment of a visual wear indicator.
FIGS. 34-37 are perspective views of a portion of the tire tread and its progressive change in conformation or visual impression as the tread wears.
Figure 33:
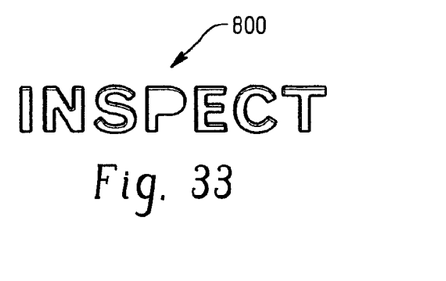
FIG. 33 shows the appearance of the word incorporated into the sipe blade of FIG. 32.
Figure 35:
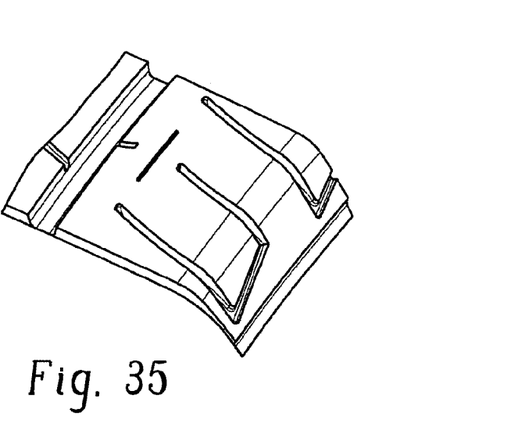
Figure 36:
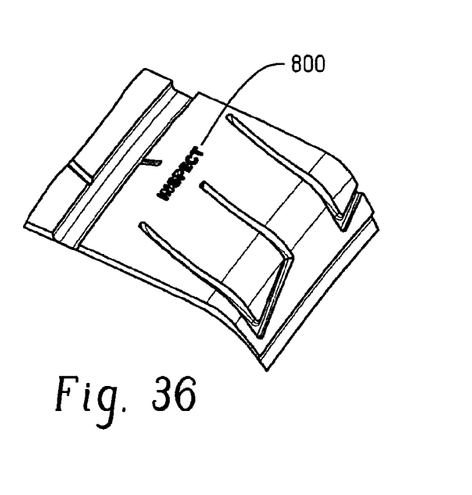
Figure 37:
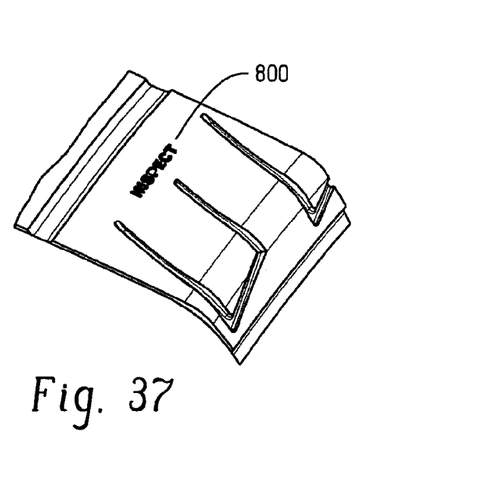
Figure 38:
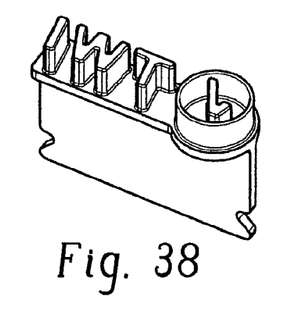
FIG. 38 is a perspective view of a mold component (sipe blade) that forms another preferred embodiment of a visual wear indicator.
Figure 39:
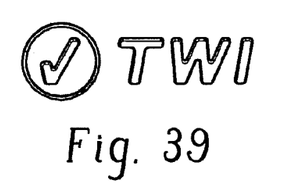
FIG. 39 shows the appearance of the word incorporated into the sipe blade of FIG. 38.
Figure 40:
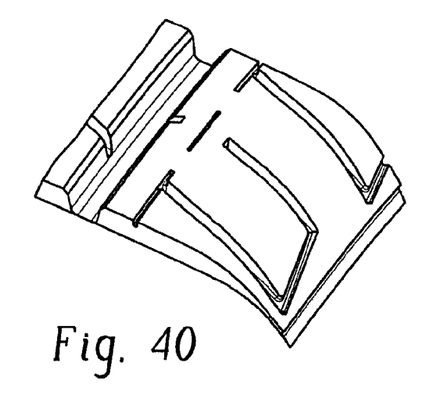
FIGS. 40-43 are perspective views of a portion of the tire tread and its progressive change in conformation or visual impression as the tread wears.
Figure 41:
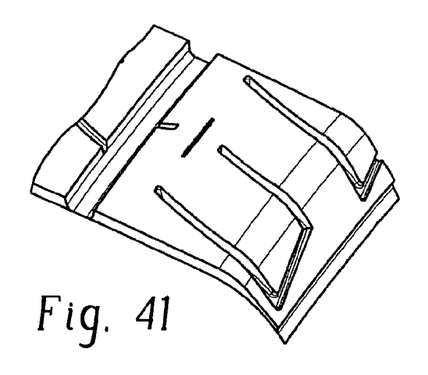
Figure 42:
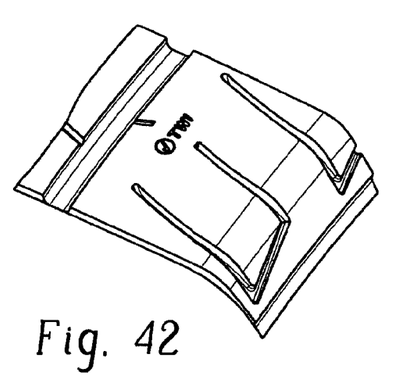
Figure 43:
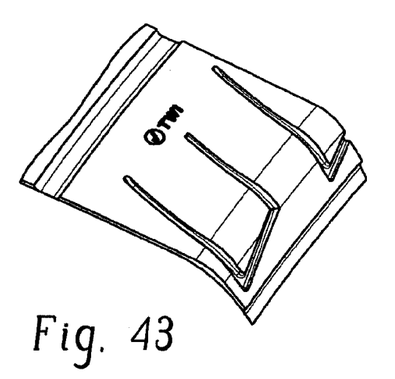

The embodiment of FIGS. 26-31 illustrates how the mold component or sipe blade 740 (FIG. 26) creates a visual wear indicator 700 that spells out the word "REPLACE" (FIG. 27). Thus, the progressive wear of the tread sequentially illustrated in FIGS. 28-31 shows how tread features become worn and the word "REPLACE" becomes visible (FIGS. 30-31).

In a similar manner, the embodiment of FIGS. 32-37 illustrate that another word or message can be conveyed to the tire owner, namely "INSPECT" (and it will likewise be appreciated that still other words can be used within the scope of the present disclosure). The embodiment of FIGS. 38-43 demonstrate that the message conveyed to the tire owner can be a combination of a symbol (checkmark in a circle) and an acronym ("TWI"). These additional embodiments, however, may not provide the progressive, incremental tread wear information associated with the earlier embodiments described above.

Figure 44:
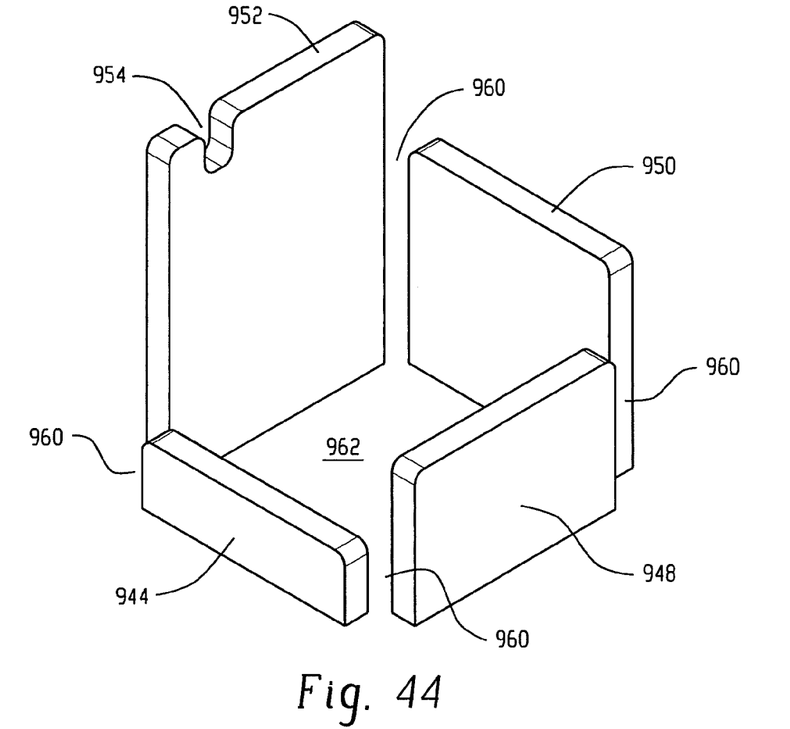
FIGS. 44-45 are plan and perspective views of a mold component that forms another preferred embodiment of a visual wear indicator.
Figure 45:
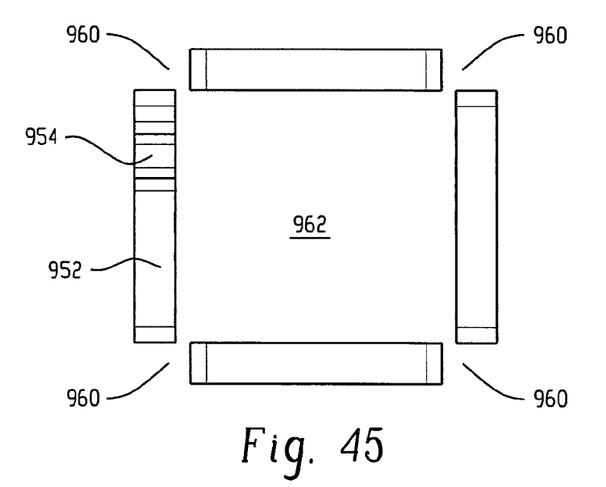

In FIGS. 44-45, a modified embodiment of a mold component or sipe blade 940 that forms a sipe or visual wear indicator in a tire is shown. The sipe blade 940 bears structural and functional similarities to the embodiment shown and described in FIGS. 3-4, but is modified by providing one or more open corners. More particularly, discrete portions 944, 948, 950, and 952 of the sipe blade are provided and extend outwardly different heights from a mold inner surface in the same manner as described above. In addition, the sipe blade portion 952 includes recess 954 that forms an exclamation point "!" upon reaching a depth range of the tire tread at which the owner should be taking urgent action to replace the tire. The discrete portions 944, 948, 950, 952 are spaced apart to form one or more gaps or openings 960 at the corners. By not completely closing the mold component 940 by providing two or more distinct and discrete portions (944, 946, 948, 950), the openings allow for venting of a central area or region 962 of the mold component.

The above-described visual wear indicating features incorporated into the tread pattern do not replace the current tread wear indicators, but rather complement them in progressively indicating to the customer the "status" of the tread with a continually wearing indicator. The visual wear indicator is able to notify the consumer (tire owner) approximately how much tread is remaining in the tire. All of the visual wear indicator embodiments described above are easily locatable due to the "VWI" text that is provided on the buttress and tread pattern near the VWI feature. It is also appreciated that the wear indicator is described above relative to the useable portion of the tread, i.e., relative to the tread portion from full tread to 2/32" of tread (which is the depth at which the well-known wear bar or tread bar is situated). Therefore, all of the depths and percentage of tread depth are described with the understanding that 2/32" is the tread depth at which the tire tread is no longer deemed useable. Of course the depths could also have been expressed herein relative to the complete depth of the tire tread, and as a result the corresponding percentages would change but without altering the scope and intent of the present disclosure.

This written description uses examples to describe the disclosure, including the best mode, and also to enable any person skilled in the art to make and use the disclosure. Other examples may readily occur to those skilled in the art. Such other examples are intended to be within the scope of the present disclosure if these examples use structural elements that do not differ from the literal language of the description, or if the examples include equivalent structural elements with insubstantial differences from the literal language of the description. Moreover, this disclosure is intended to seek protection for a combination of components and/or steps and a combination of features or claims as originally presented for examination, as well as seek potential protection for other combinations of components and/or steps and combinations of features or claims during prosecution.

We claim:

1. A tire comprising:
   a tread region of the tire having a ground engaging surface; and
   a visual wear indicator formed in the tread region having a first portion extending substantially radially inward into the tread region from the ground engaging surface by a first dimension which ranges from 0% to about 25% of a useable tread depth, a second portion extending substantially radially inward into the tread region from the ground engaging surface by a second dimension which ranges from about 25% to about 50% of a useable tread depth, a third portion extending substantially radially inward into the tread region from the ground engaging surface by a third dimension which ranges from about 50% to about 75% of a useable tread depth, and a fourth portion extending substantially radially inward into the tread region from the ground engaging surface by a fourth dimension which ranges from about 75% to about 100% of a useable tread depth;
   wherein the first, second, third, and fourth portions of the visual wear indicator are arranged in an open-centered square where the first portion is perpendicular to the second and fourth portions, the second portion is perpendicular to the first and third portions, the third portion is perpendicular to the second and fourth portions, and the fourth portion is perpendicular to the third and first portions, the first, second, third, and fourth portions of the visual wear indicator enclose a central region therebetween and are spaced apart to facilitate venting of the central region, and the fourth portion forms an exclamation point upon reaching approximately 100% of the useable tread depth, the first, second, third, and fourth portions of the visual wear indicator progressively increase in depth around a perimeter.

2. The tire of claim 1 wherein the visual wear indicator is located in a shoulder region of the tire.

3. The tire of claim 1 wherein the visual wear indicator is located in both inner and outer shoulder regions of the tire.

4. The tire of claim 1 wherein the visual wear indicator is located at spaced locations in the tire.

5. The tire of claim 1 wherein the visual wear indicator is located at circumferentially spaced locations in the tire.

6. The tire of claim 1 wherein the visual wear indicator is located at a same circumferentially spaced location in both inner and outer shoulder regions of the tire.

7. The tire of claim 1 wherein the visual wear indicator is located at at least three, generally equally-spaced circumferential locations.

8. The tire of claim 1 wherein the visual wear indicator further comprises indicia provided on a sidewall of the tire at a same circumferential location of the tire as the wear pattern.

9. The tire of claim 1 wherein the visual wear indicator further comprise a fifth portion to provide greater granularity.

10. The tire of claim 1 wherein in the visual wear indicator, (i) the first portion is joined at a first end to the second portion and at a second end to the fourth portion, and the first portion has the least depth, (ii) the second portion is joined at a first end to the first portion and at a second end to the third portion, and the second portion has a depth greater than the first portion, (iii) the third portion is joined at a first end to the second portion and at a second end to the fourth portion, and the third portion has a depth greater than the second portion, and (iii) the fourth portion is joined at a first end to the third portion and at a second end to the first portion, and the fourth portion has a depth greater than each of the first, second, and third portions.

11. The tire of claim 10 wherein the fourth portion of the visual indicator has first and second regions of different depths to form the exclamation point.

* * * * *